United States Patent [19]

Champs et al.

[11] Patent Number: 5,196,770

[45] Date of Patent: Mar. 23, 1993

[54] VERTICALLY RECIPROCATING CONSTANT POWER DRIVE UNIT FOR RAISING A LOAD STEP BY STEP

[75] Inventors: Paul Champs, Nantes; Joël Chardonneau, Orvault; Jean-Louis Maupu, Villejuif; Jean-Bernard Ayasse, Chevilly-Larue, all of France

[73] Assignee: Marine and Petroleum Equipment, Nantes, France

[21] Appl. No.: 679,070

[22] PCT Filed: Dec. 1, 1989

[86] PCT No.: PCT/FR89/00626

§ 371 Date: Jun. 10, 1991

§ 102(e) Date: Jun. 10, 1991

[87] PCT Pub. No.: WO90/07215

PCT Pub. Date: Jun. 28, 1990

[30] Foreign Application Priority Data

Dec. 12, 1988 [FR] France ................... 88 16313

[51] Int. Cl.$^5$ .............. F04B 17/04; H02K 41/02
[52] U.S. Cl. ................... 318/135; 318/119; 310/14; 417/334; 166/66.4
[58] Field of Search .............. 166/66.4, 66.5, 68, 166/105; 318/115, 135, 132, 121; 310/13, 14, 15; 417/417, 334, 336

[56] References Cited

U.S. PATENT DOCUMENTS

| | | | |
|---|---|---|---|
| 2,122,888 | 10/1934 | McLeer | 318/121 |
| 3,681,629 | 4/1971 | Drye | 310/14 |
| 4,249,867 | 5/1979 | Cunningham | 417/334 |
| 4,281,263 | 7/1981 | Virolleau et al. | 318/135 |
| 4,402,386 | 9/1983 | Ficheux et al. | 187/29 |
| 4,562,385 | 12/1985 | Rabson | 318/135 |
| 4,687,054 | 3/1985 | Russell et al. | 166/66.4 |
| 4,924,675 | 1/1990 | Higham et al. | 310/15 |

Primary Examiner—William M. Shoop, Jr.
Assistant Examiner—John W. Cabeca
Attorney, Agent, or Firm—Griffin, Butler, Whisenhunt & Kurtossy

[57] ABSTRACT

A vertically reciprocating and substantially constant power drive unit, including pumping equipment situated at the bottom of a string of drive rods is provided. The drive unit comprises a linear electric motor whose field inductor and whose armature are constituted by two coaxial cylindrical parts, one of which is coupled to the top end of the drive rods and is movable relative to a stationary structure. A balancing device exerts a force on the moving equipment constituted by the pumping equipment, the rods, and the motor coupled thereto, which force is equal and opposite to the sum of the weight of the moving equipment plus one-half the weight (H/2) of the load.

9 Claims, 2 Drawing Sheets

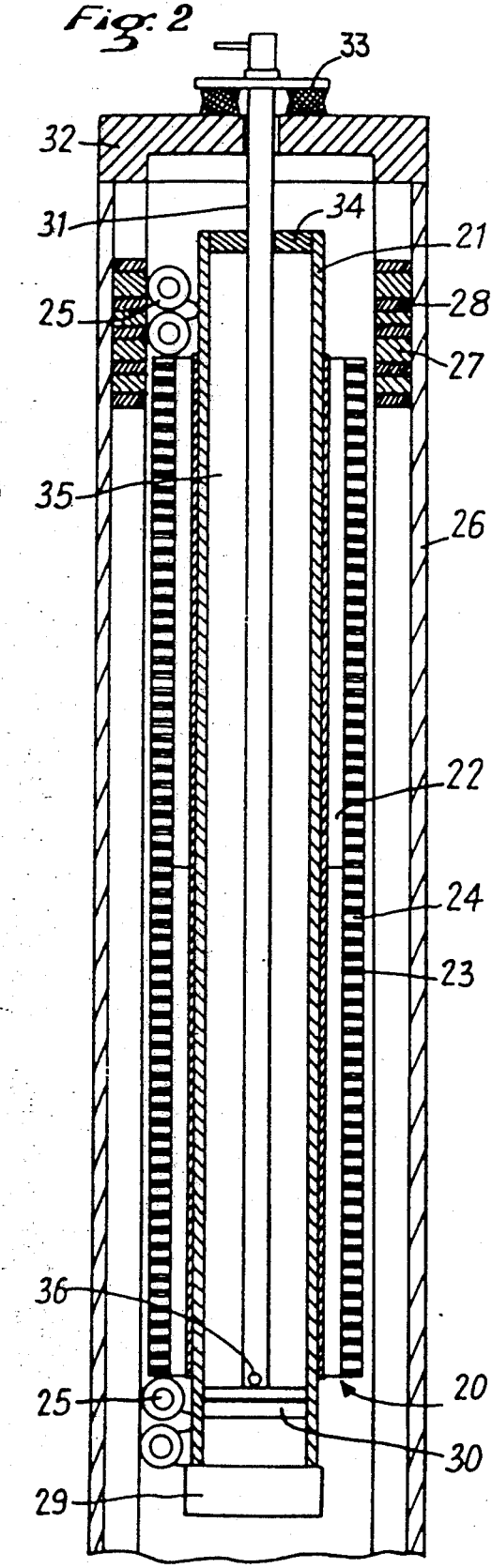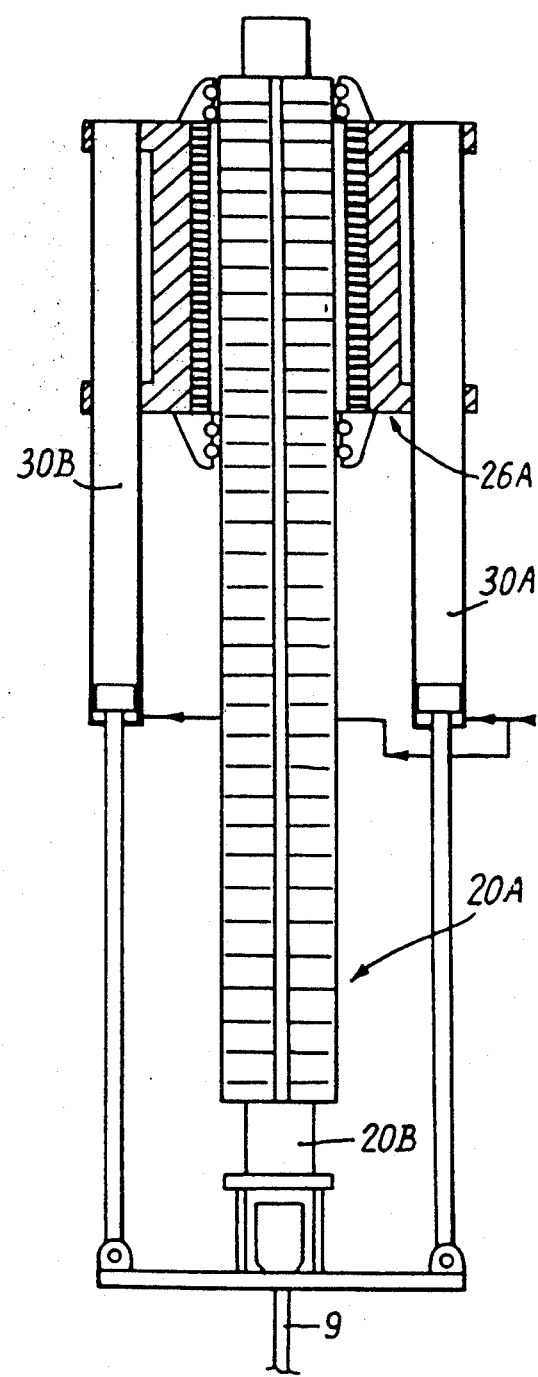

VERTICALLY RECIPROCATING CONSTANT POWER DRIVE UNIT FOR RAISING A LOAD STEP BY STEP

The present invention relates to a drive device for imparting vertical stepwise motion at substantially constant power to a load, in particular for actuating a vertical reciprocating pump such as that generally disposed at the bottom of a well for extracting oil or water.

BACKGROUND OF THE INVENTION

Such pumping installations usually comprise a piston pump which is lowered inside the well to a specified depth. Its cylinder is securely fixed to the casing of the well while its piston is free to move and is connected to the actuator unit situated on the surface (ground or off-shore platform) by a string of pumping rods constituted by sections that are easily connected end to end or disconnected. The piston generally has non-return valves, and its stroke and frequency are a function of the flow rate of the well.

In all prior wells so far fitted with pumping units, the prime mover is rotary (thermal or electrical). Motion is then transformed either mechanically (nodding beams) or else hydraulically (pump units having actuators). The drive system connecting the prime mover to the string of rods includes members that need to be maintained and adjusted, thus requiring on-site maintenance during extraction, and under current operating conditions the cost of such maintenance is becoming an ever greater burden, particularly in the oil industry.

SUMMARY OF THE INVENTION

The present invention seeks to reduce the fraction of extraction costs represented by such maintenance to as little as possible by simplifying the system for transmitting and transforming motion from the power source to the string of rods.

To this end, the present invention provides a vertically reciprocating and substantially constant power drive unit for raising a load step by step, the drive unit comprising a linear electric motor whose field inductor and whose armature are constituted by two coaxial cylindrical parts, one of which is coupled to a support for the load to be moved and is movable relative to a stationary structure, and further comprising a balancing device exerting a force on the moving equipment constituted by the support for the load and the part of the motor which is coupled thereto, which force is equal and opposite to the sum of the weight of the moving equipment plus one-half the weight of the load.

In a first embodiment, the inductor is fixed relative to the structure, with the armature being made around a moving actuator cylinder constituting a part of the balancing device.

In a variant of this first embodiment, the armature is implemented around a central cylindrical part coupled to the load support, while the balancing device is constituted by at least one actuator parallel to the axis of the armature and coupled between the inductor and the armature.

In a second embodiment, the inductor and the armature are both movable relative to the stationary structure and they are mechanically coupled to each other by at least one flexible suspension link for suspending each of them from the structure, the inductor constituting a part of the balancing device.

The description given below of embodiments of the invention provides better understanding and shows up secondary characteristics and advantages.

BRIEF DESCRIPTION OF THE DRAWINGS

Reference is made to the accompanying drawings, in which:

FIG. 2 is an axial section view through a first embodiment of the drive unit of the invention;

FIG. 3 is an axial section view of a variant of the FIG. 2 embodiment; and

DESCRIPTION OF THE PREFERRED EMBODIMENTS

Figure 1:
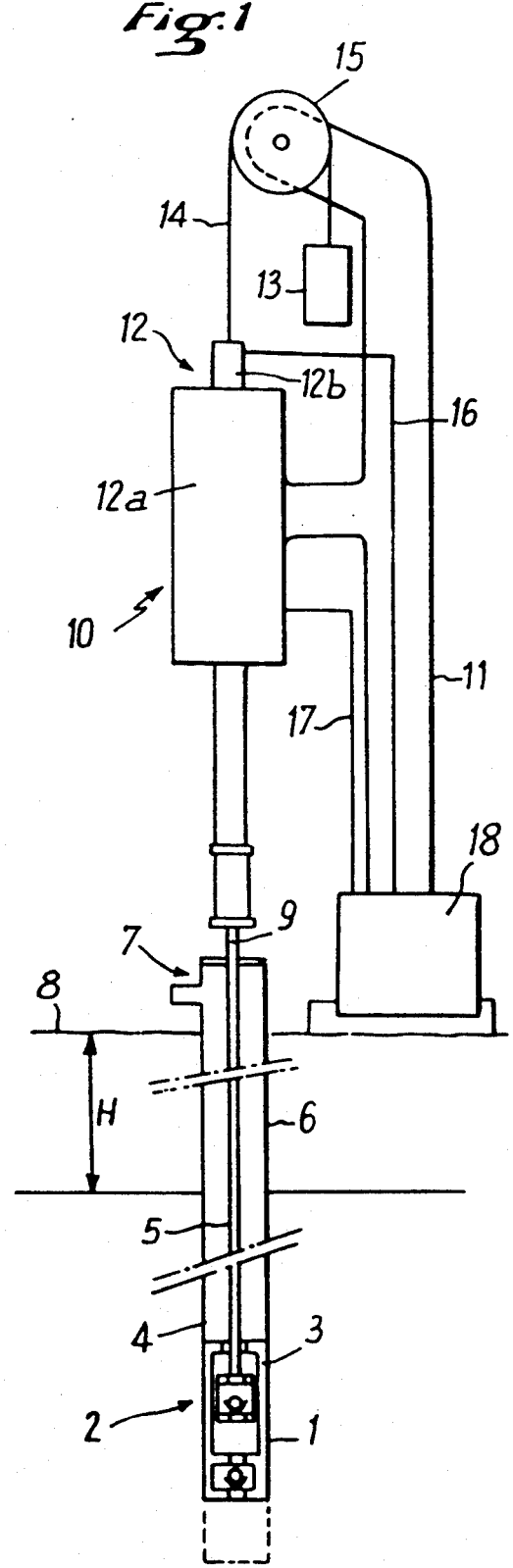
FIG. 1 is a diagram showing the general dispositions of a downhole pump fitted with a drive unit of the invention.

FIG. 1 shows a pumping installation for extracting fluid (oil, water, . . .) from an underground deposit and present at the bottom of a well 1. In conventional manner, this installation comprises a downhole pump 2 including a piston 3 (with non-return valves) and a cylinder 4 inside which the piston is driven with reciprocating motion by a string of rods 5. The pump cylinder 4 is extended by a tubular assembly 6 for conveying the pumped fluid to the well head. The "free" level of fluid in the deposit is at a depth H below the surface of the ground 8 (or the extraction platform if extraction is taking place off shore).

The top portion 9 of the string 5 of rods is coupled to a drive unit (or pumping unit) 10 which imparts vertical reciprocating motion to this string of rods to actuate the piston 3, with the amplitude, speed, and rate of the motion being adjusted as a function of the flow rate of the well.

A stationary structure is shown highly diagrammatically at 11 to illustrate the need for having such a structure with any embodiment of the pumping unit. Its shape and height are adapted to different embodiments as explained below. The essential function of the stationary structure 11 is to constitute a support for the stationary portions of the pumping unit and for supporting the forces it develops in operation.

The drive elements of the pumping unit 10 comprise firstly a linear electric motor 12 comprising a field inductor and an armature that are movable relative to each other, one of these members (inductor or armature) being coupled to the top 9 of the string of rods, while as explained below, the other one is either stationary and thus supported by the structure 11, or else it too moves relative to the structure, but is coupled to the first member, and the assembly is supported by the structure. The drive elements comprise secondly a balancing device, represented in this case by a counterweight 13, serving to exert a force on the moving equipment of the pumping unit (piston 4, string of rods 5, and drive member coupled to the string of rods), which force is equal and opposite to the weight of said moving equipment plus the weight of half the column of fluid to be raised.

In FIG. 1, the balancing device is represented by a counterweight 13 coupled to the moving equipment by a cable 14 which passes over a sheave 15 carried by the structure 11. It is shown diagrammatically and it will be seen with reference to the following figures that the balancing mechanism may take other forms, while also providing some suspension for the moving equipment by the stationary structure.

The purpose of the balancing device is to reduce the driving forces that need to be generated and to spread them as uniformly as possible over the upstroke and the downstroke of the piston. These driving forces would be very unequal in the absence of such a device. When the piston 4 is at bottom dead center in the pumping cycle, the drive member must deliver a force equal to the weight of the moving equipment plus the weight of the column of fluid of height H (which is commonly several hundred meters) to raise the piston through one stroke (a few meters) of negligible height compared with H. After top dead center, the moving equipment moves down again under its own weight (the weight of the column H no longer having any effect since the non-return valves in the piston open). The motor would then need to operate as a brake. The same applies to any load that needs lifting step by step, e.g. extracting a vertically buried tube by means of a grapple inside it and coupled to the end of the string of rods which supports the load.

With the balancing device applying a constant force to the moving equipment equal and opposite to its own weight plus one-half the weight of the fluid column of height H, the driving force when raising the piston is reduced by the same amount and is equal to no more than that required for raising a fluid column of height 0.5H. On the downstroke, the motor needs to overcome the excess balancing force which is equal to 0.5H since the fluid column no longer acts on the piston. The motor thus needs to generate the same force in both directions of piston movement.

By using a linear motor 12 as the drive member, it is possible to provide advantageous embodiments of the balancing device.

The linear motor 12 of FIG. 1 diagrammatically illustrates the fact that it comprises two coaxial cylindrical parts 12a and 12b, one of which is a field inductor and the other is an armature. In the present case, the outer part 12a may be constituted by a stationary inductor as in the example of FIG. 2. The armature 12b is then the inside part which moves axially inside the inductor. In the application to pumping installations, a synchronous linear motor should be selected since that makes it possible to obtain better operation than can be obtained with an asynchronous motor while using conventional servo-control means. In this case, the armature of the motor is fed with DC (conductors 16) while the inductor is fed with polyphase AC (conductors 17) generated by means of a variable frequency inverter which is servo-controlled to the relative positions of the parts, and to displacement settings (end-of-stroke positions, speed, . . .) for the purpose of optimizing efficiency and avoiding loss of synchronization. The source for these currents and the electronic servo-control circuits (apart from the sensors for sensing displacement of the moving parts) are combined under reference 18 in FIG. 1.

When the inductor is the moving part 12b, it is fed with polyphase AC and the outer stationary armature constituted by the part 12a is fed with DC. Compared with the preceding disposition, this disposition suffers from the drawback of the difficulty of cooling the inductor inside the tubular armature.

FIG. 2 shows in greater detail the combination of a synchronous linear motor having an outer inductor and a balancing device.

The moving armature 20 of the linear motor of FIG. 2 comprises a central tube 21 having a body 22 disposed around it and fixed thereto. The body is laminated in radial planes. For example it may be constituted by insulated strips of steel placed in packets that are as radial as possible and edge on around the central tube 21. The body is then provided with poles (or teeth) 23 which are laminated but in a plane perpendicular to the axis of the tube 21. For example, each tooth may be constituted by a stack of washers possessing at least one radial slot, the washers being angularly offset relative to one another, isolated relative to one another, and fixed together (by adhesive) in order to constitute a rigid ring giving greater coherence to the body. An armature winding 24 is wound between each of the teeth or rings 23, and when connected in series with all of the other windings and conveying DC, serves to generate an alternating sequence of poles along the tube 21. This armature is fed via a flexible conductor or the like capable of following the reciprocating motion. At the ends of the electrical portion per se of the moving part, the tube carries running wheels 25 via appropriate supports, with the wheels being regularly spaced around the tube 21 and having their rolling axes perpendicular to the radial plane of the tube. These planes are preferably at 120° angular offsets around the axis of the tube. Any other guide members (skids, smooth bearings, . . .) could be used.

The outer inductor of the motor is constituted by a solid cylindrical body 26 of magnetic steel including an internal alternating stack of windings 28 and solid washers 27 constituting teeth or poles. The particular design of the washers 27 is not shown in the figure, but it serves to cause each of them to center itself relative to the others in order to sandwich the windings without crushing them when they are subjected to axial force, e.g. by draw bars running through the stack and outside the windings. The windings are fed with three-phase AC by conductors that are not shown.

The inside face of the inductor has a composite cylindrical surface on which the wheels 25 of the armature run. Thus, the armature is centered inside the inductor and is guided therealong. In order to improve the running of the armature inside the inductor, tracks may be provided along internal generator lines of the inductor to co-operate with the wheels.

The fixed inductor is held by a support such as the support 11 described with reference to FIG. 1. For low capacity installations or installations having a low pumping load, the inductor may be fixed directly to the well head or on an appropriate bedplate which is fixed thereto.

For generating driving forces, it is favorable for the armature and the inductor to be large in diameter. As a result, the inside tube 21 of the armature may advantageously either constitute the cylinder of an actuator, or else it may constitute a housing for receiving an actuator that constitutes the balancing device mentioned with respect to FIG. 1. In the example shown, the cylinder is coupled to the string of rods of the installation by an end portion 29 which does not close the cylinder in fluid-tight manner and which contains a piston 30 whose piston rod 31 is fixed to the inductor via a top plate 32 thereof and via a suspension member 33 to which the rod is fixed. The cylinder 21 is closed by a top wall 34 through which the rod 31 passes in sealed manner. The piston thus delimits a variable volume chamber 35 inside the cylinder, which chamber is permanently in communication with a source of pneumatic or hydraulic pressure (not shown) via a channel inside the rod 31 and opening out into the chamber 35 via the orifice 36. This pressure source may advantageously include a variable volume whereby variations in the volume of the chamber 35 do not give rise to variations of pressure. It is thus possible to create a balancing force for the moving equipment as defined with reference to FIG. 1 which is equal to the area of the wall 34 multiplied by the pressure to which it is subjected inside the chamber 35. By adjusting the pressure inside this chamber, it is possible to adjust the balancing force to the desired value. For an actuator received inside the housing, the rod of the actuator should be coupled to the top plate 32 of the inductor and the cylinder of the actuator should be coupled to the central tube of the armature by any appropriate means.

The advantage of this balancing device lies in the fact that it does not increase the size of the pumping unit. Apart from the energy required to compensate for leaks, it does not consume any energy and therefore, if it is pneumatic or hydropneumatic, it may operate from a source of compressed gas which is constituted by a gas cylinder.

In FIG. 2, the inductor is long and the armature is short, thus presenting the advantage of reducing the weight of the moving equipment.

FIG. 3 is a diagram showing a variant of the FIG. 2 embodiment in which the inductor 26A is fixed, but short, with the armature 20A being made around a central tube 20B whose length is not less than the stroke length plus the axial length of the inductor. The armature is guided inside the inductor by means of wheels fixed on the inside of the inductor. The compensation mechanism then includes two (or more) pneumatic or hydraulic actuators coupled between the inductor 26A (or the structure supporting it) and the tube 20B beyond the windings of the armature. The actuators 30A and 30B are connected to a constant pressure source and they generate the balancing force as defined above (tending to raise the armature). Large cooling fins are provided on the outside of the armature body given its compactness and the power that is to be dissipated.

Figure 4:
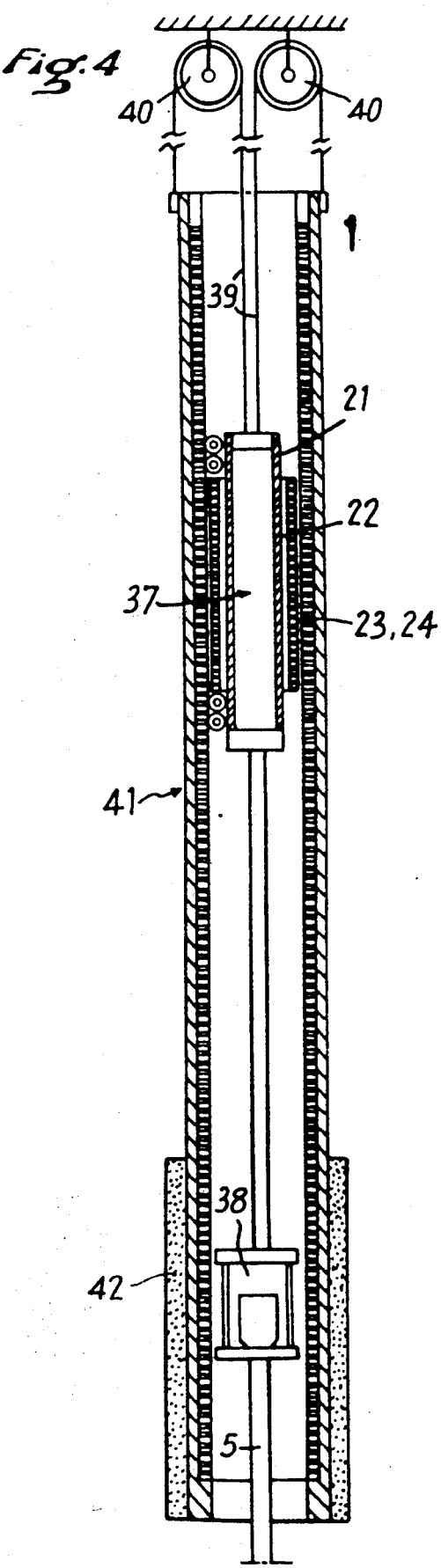
FIG. 4 is an axial section view of a second embodiment of the drive unit.

FIG. 4 shows a variant embodiment of the invention. In this variant, the inside armature 37 is likewise constituted by a tube 21 fitted with a laminated magnetic body 22, alternating laminated annular poles 23 and windings 24, and wheels 25 as in the preceding figure. Its bottom end is likewise coupled to the string of rods 5 via a conventional coupling 38, and its top end is coupled to flexible links or cables 39. These cables pass over fixed sheaves 40 carried by a stationary structure such as the structure 11 in FIG. 1, and they are fixed at their other ends to the outside field inductor 41 which has the same structure as the inductor of FIG. 2 except that it is longer (its length is equal to twice the stroke of the pumping system plus the axial length of the armature) because it moves relative to the stationary structure. It can be seen that with this disposition the relative inductor-armature stroke is double that of the preceding figure, thereby making it possible, other things being equal, to halve the magnetic interaction forces between the armature and the inductor. The inductor then constitutes the balancing device of the moving equipment by virtue of its own weight. Thus, as a function of the pumping load, it is possible to adapt the dimensions of the linear motor for performing this balancing function to the weight of the moving equipment plus the weight of the half column of fluid to be raised. It is also possible to equip the inductor with a tank 42 which can be filled to a greater or lesser extent with solid or liquid ballast to act on this balancing force.

It is also possible to add the central actuator of FIG. 2 to this variant embodiment for the purpose of matching and adjusting the balancing force. In this case, the actuator rod coupled via its free end to the stationary support of the sheaves 40 should have a length corresponding substantially to twice the stroke of the piston in order to take account of the motion of the inductor relative to the stationary structure.

In some applications of this FIG. 3 variant, the relative speed of the moving parts and the amplitude of their relative motion make it possible to use an asynchronous linear motor, i.e. one in which the armature is no longer DC powered, but merely includes conductors suitably disposed relative to the moving fields generated by the inductor to generate the electromotive forces required for driving purposes.

It may be observed that the electronics for controlling the linear motor require relative displacement sensors to be provided on the moving parts. In the FIG. 2 example these may be proximity sensors e.g. looking through the inductor and counting the passage of armature poles. In the example of FIG. 3, the sensors may more easily be linked to the sheaves 40.

Finally, in addition to it being possible to use a synchronous motor or an asynchronous motor, it is mentioned that the linear motor could be provided in the form of a reluctance motor requiring electronics for controlling the excitation of the inductor, with the armature then comprising no more than a magnetic member without conductors.

We claim:

1. A vertically reciprocating power drive unit for raising a load step by step by means of a load support for supporting the load, the drive unit comprising a linear electric motor having a field inductor and an armature which are constituted by two coaxial cylindrical parts, one of which cylindrical parts is coupled to a top end of the support and is movable relative to a stationary structure, and a balancing device exerting a force on moving equipment constituted by the support and the cylindrical part of the motor which is coupled to the support, which force is equal and opposite to the sum of the weight of the moving equipment plus one-half of the weight (H/2) of the load such that the power required by the drive unit is substantially constant.

2. A drive unit according to claim 1, wherein the inductor constitutes the outside part of the motor and the armature is coupled to the load support.

3. A drive unit according to claim 2, wherein the inductor is fixed relative to the stationary structure, and the armature is disposed around a moving cylinder which is coupled to the load support.

4. A drive unit according to claim 3, wherein the moving cylinder constitutes the housing of an actuator which together with a fixed piston defines a balancing chamber.

5. A drive unit according to claim 3, wherein the moving cylinder is coupled to the stationary structure by at least one balancing actuator which is external to the armature and parallel to the moving cylinder.

6. A drive unit according to claim 2, wherein the inductor and the armature move relative to the stationary structure and are mechanically coupled together by at least one flexible link for suspending both of them from the structure, with the inductor constituting a part of the balancing device.

7. A drive unit according to claim 1, wherein the linear motor is a synchronous motor.

8. A drive unit according to claim 6, wherein the linear motor is an asynchronous motor.

9. A drive unit according to claim 1, wherein the linear motor is a reluctance motor. a

* * * * *